United States Patent
Chen et al.

(10) Patent No.: US 7,458,731 B2
(45) Date of Patent: Dec. 2, 2008

(54) FIBER ASSEMBLY AND LIGHT TRANSMITTING/RECEIVING MODULE

(75) Inventors: Horng-Nian Chen, Hsinchu (TW); Sung-Ping Huang, Hsinchu (TW)

(73) Assignee: GigaComm Corporation, Hsinchu (TW)

( * ) Notice: Subject to any disclaimer, the term of this patent is extended or adjusted under 35 U.S.C. 154(b) by 145 days.

(21) Appl. No.: 11/277,226

(22) Filed: Mar. 22, 2006

(65) Prior Publication Data
US 2007/0147743 A1    Jun. 28, 2007

(30) Foreign Application Priority Data
Dec. 27, 2005 (TW) .............................. 94222724 U

(51) Int. Cl.
*G02B 6/36* (2006.01)

(52) U.S. Cl. .............................. 385/88; 385/90; 385/91; 385/92; 385/31

(58) Field of Classification Search ............. 385/88, 385/90, 91, 31, 92
See application file for complete search history.

(56) References Cited

U.S. PATENT DOCUMENTS

| 6,804,436 | B2 * | 10/2004 | Healy ........................ 385/33 |
| 6,917,738 | B2 * | 7/2005 | Guerra et al. ............... 385/117 |
| 7,070,339 | B2 * | 7/2006 | Nagasaka et al. ............ 385/88 |
| 2006/0098925 | A1 * | 5/2006 | Nakanishi et al. ............ 385/93 |
| 2007/0122091 | A1 * | 5/2007 | Kobayashi .................. 385/104 |

* cited by examiner

*Primary Examiner*—James P Hughes
(74) *Attorney, Agent, or Firm*—Jianq Chyun IP Office

(57) ABSTRACT

A light transmitting/receiving module comprising a fiber assembly and a light source is provided. The fiber assembly includes a fiber, a ferrule, and a rigid tube. The fiber has an end segment, wherein the end segment has a slanted end surface. The ferrule covers the end segment and exposes the slanted end surface. An axis of the end segment in the ferrule has an included angle with an axis of the other part of the fiber. Additionally, the rigid tube covers the fiber and the ferrule, and an axis of the rigid tube is parallel to the axis of the other part of the fiber. The light source is disposed beside the slanted end surface and emits a light, wherein the light is emitted to the slanted end surface in a direction parallel to the axis of the rigid tube. The light transmitting/receiving module has an optimal light coupling efficiency.

9 Claims, 2 Drawing Sheets

FIBER ASSEMBLY AND LIGHT TRANSMITTING/RECEIVING MODULE

CROSS-REFERENCE TO RELATED APPLICATION

This application claims the priority benefit of Taiwan application serial no. 94222724, filed on Dec. 27, 2005. All disclosure of the Taiwan application is incorporated herein by reference.

BACKGROUND OF THE INVENTION

1. Field of the Invention

The present invention relates to an improved design of a light communication device, and more particularly, to a light transmitting/receiving module having an optimal light coupling efficiency and a design for a fiber assembly thereof.

2. Description of the Related Art

In the light communication mechanism, the typical electronic signals, especially the digital electronic signals, are converted into a light signal and transmitted through the fiber. The light transmitting/receiving module of the light communication module usually uses a laser diode as a light source, and the light emitted by the light source is emitted to the fiber, such that the light signal is transmitted through the fiber. However, with the increase of the light communication load and the wide bandwidth requirement, methods of improving the light coupling efficiency of the light transmitting/receiving terminal and improving the light signal strength and the transmission distance had become the important subjects of the development.

Figure 1:
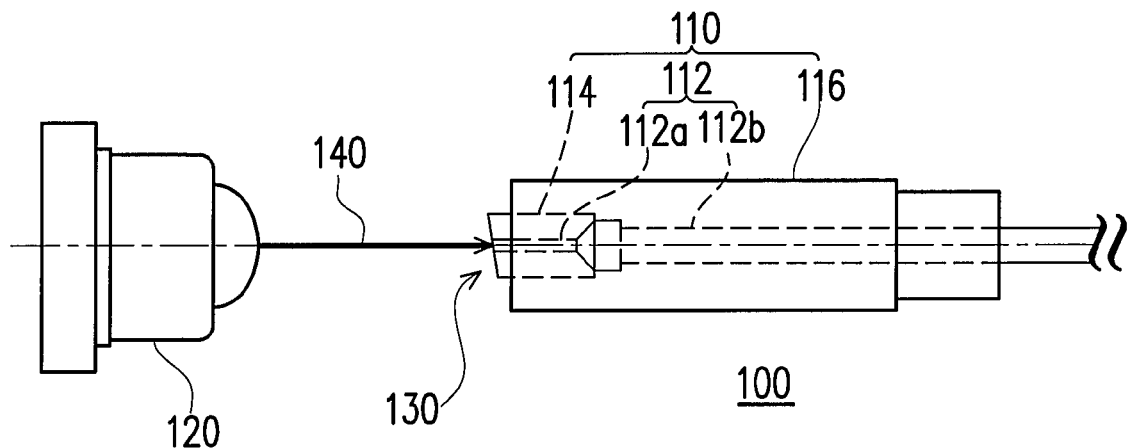

FIG. 1 schematically shows a light transmitting/receiving terminal (also referred to as a light transmitting/receiving module hereinafter) of a light communication module in the conventional technique. As shown in FIG. 1, the light transmitting/receiving module 100 comprises a fiber assembly 110 and a laser diode 120. The fiber assembly 110 comprises a fiber 112, a ferrule 114, and a metal tube 1116. The fiber 112 comprises a core 112a and a cladding 112b, wherein the cladding 112b covers the core 112a, and the refractive index of the core 112a is greater than that of the cladding 112b. Therefore, after the light is emitted into the core 112a, the light is totally reflected on the junction of the core 112a and the cladding 112b, such that the purpose of transmitting the light signal in long distance is achieved.

Referring to FIG. 1, the end segment of the fiber 112 has a slanted end surface 130, and the ferrule 114 covers the core 112a that is disposed on the end terminal of the fiber 112 and exposes the slanted end surface 130. In addition, the metal tube 116 covering the fiber 112 and the ferrule 114 provides a protecting and positioning function. An axis of the metal tube 116 is parallel to an axis of the fiber 112. Moreover, the laser diode 120 is disposed beside the slanted end surface 130 and emits a light 140, wherein the light 140 is emitted to the slanted end surface 130 in a direction parallel to the axes of the metal tube 116 and the fiber 112, such that the light 140 is transmitted to a remote terminal through the fiber 112.

It is to be noted that since the fiber 112 has a slanted end surface 130, when the light 140 is emitted to the slanted end surface 130 in a direction parallel to the axes of the metal tube 116 and the fiber 112, it is not possible to obtain an optimal light coupling efficiency, which significantly affects the transmission performance of the light signal.

Figure 2:
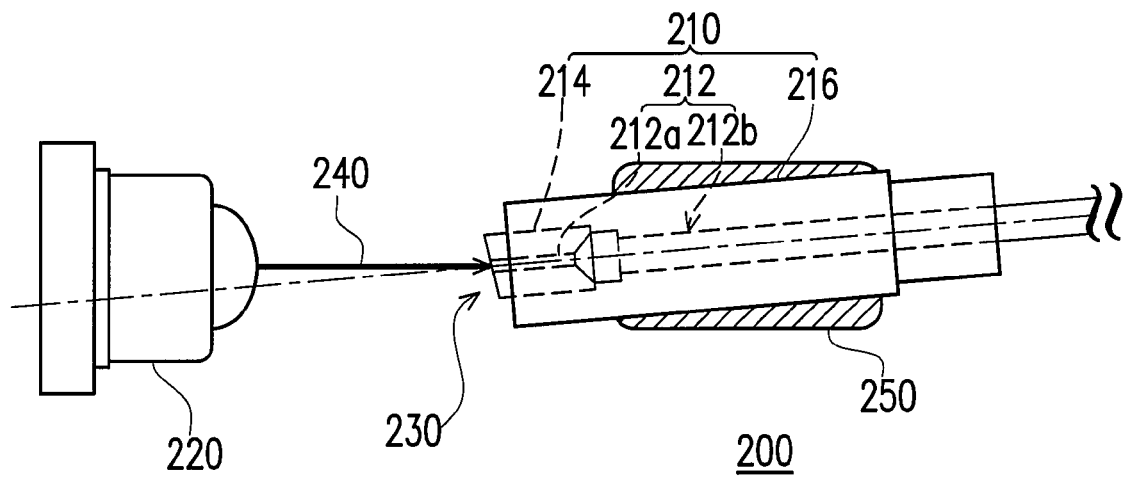

FIG. 2 schematically shows another conventional light transmitting/receiving module. Referring to FIG. 2, in the conventional light transmitting/receiving module 200, the whole set of fiber assembly 210 (including the fiber 212, the ferrule 214, and the metal tube 216) is disposed at an specific inclined angle with an outer tube 250, such that the light 240 emitted by the laser diode 220 is emitted to the slanted end surface 230 with a better incident angle, so as to improve the light coupling efficiency. However, some disadvantages still exist in the improved light transmitting/receiving module. For example, an outer tube 250 requires to be additionally added to fix the fiber assembly 210, which would increase both the size and the manufacturing cost of the light transmitting/receiving module 200.

SUMMARY OF THE INVENTION

Therefore, it is an object of the present invention to provide a fiber assembly capable of providing an optimal light coupling efficiency. The fiber assembly is simplified and has a lower manufacturing cost.

It is another object of the present invention to provide a light transmitting/receiving module in which the fiber assembly is applied to obtain an optimal light coupling efficiency.

In order to achieve the objects mentioned above and others, the present invention provides a fiber assembly. The fiber assembly mainly comprises a fiber, a ferrule, and a rigid tube. The fiber has an end segment, wherein the end segment has a slanted end surface. In addition, the ferrule covers the end segment and exposes the slanted end surface. An axis of the end segment in the ferrule has an included angle with an axis of the other part of the fiber. Additionally, the rigid tube covers the fiber and the ferrule, and an axis of the rigid tube is parallel to the axis of the other part of the fiber.

The present invention further provides a light transmitting/receiving module. The light transmitting/receiving module mainly comprises the fiber assembly mentioned above and a light source. The light source is disposed beside the slanted end surface and emits a light to the slanted end surface in a direction parallel to the axis of the rigid tube.

In an embodiment of the present invention, the rigid tube is made of metal.

In an embodiment of the present invention, the ferrule is made of ceramic.

In an embodiment of the present invention, the fiber may be a single mode fiber.

In an embodiment of the present invention, the light source may be a laser diode.

In summary, in the present invention, the ferrule is slantwise disposed relative to the fiber and the light emitting direction of the light source is parallel to the rigid tube, such that the light emitted by the light source is emitted to the slanted end surface in an optimal incident angle, and an optimal light coupling efficiency is obtained. Since only the disposition of the ferrule is changed in the present invention, both the manufacturing process and the positioning are simplified. In addition, compared with the conventional technique in which the fiber assembly is fixed by the outer tube, the same effect is achieved in the present invention without adding any additional component, such that the manufacturing cost is saved.

BRIEF DESCRIPTION DRAWINGS

The accompanying drawings are included to provide a further understanding of the invention, and are incorporated in and constitute a portion of this specification. The drawings illustrate embodiments of the invention, and together with the description, serve to explain the principles of the invention.

FIG. 1 schematically shows a conventional light transmitting/receiving module.

FIG. 2 schematically shows another conventional light transmitting/receiving module.

Figure 3:
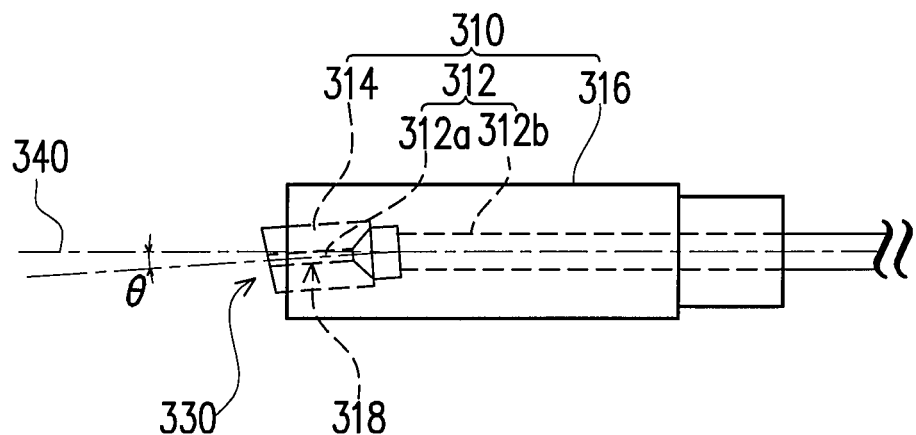

FIG. 3 schematically shows a fiber assembly according to a preferred embodiment of the present invention.

Figure 4:
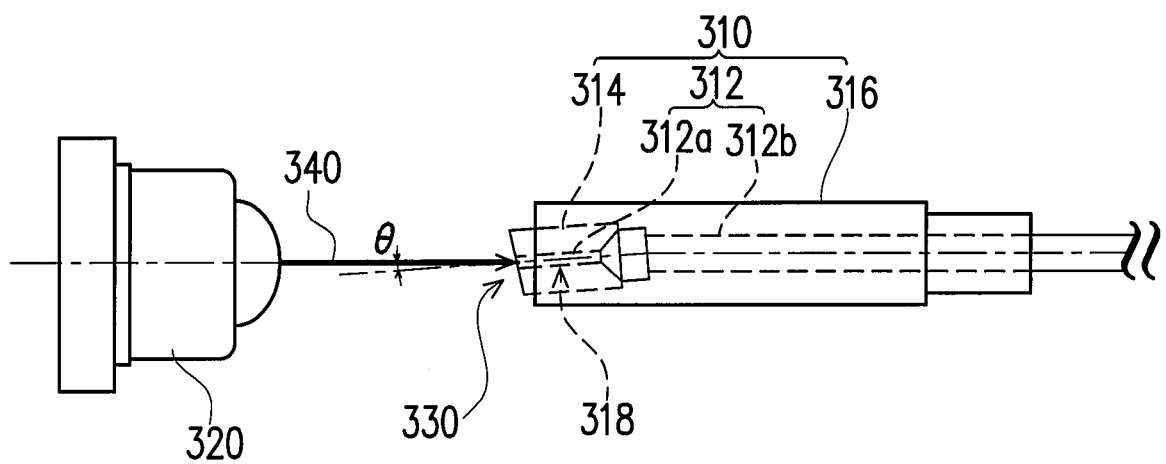

FIG. 4 schematically shows a light transmitting/receiving module according to a preferred embodiment of the present invention.

DESCRIPTION OF THE EMBODIMENTS

FIG. 3 schematically shows a fiber assembly according to a preferred embodiment of the present invention. Referring to FIG. 3, the fiber assembly 310 comprises a fiber 312, a ferrule 314, and a rigid tube 316. The fiber 312 may be a single mode tilt fiber with an end segment 318 having a slanted end surface 330. In addition, the fiber 312 comprises a core 312a and a cladding 312b. The cladding 312b covers the core 312a, and the refractive index of the core 312a is greater than that of the cladding 312b. Therefore, after the light is emitted into the core 312a, the light is totally reflected on the junction of the core 312a and the cladding 312b, such that the light signal is transmitted to a remote terminal through the fiber 312.

Referring to FIG. 3, the end segment 318 of the fiber 312 only has the part of the core 312a, and the ferrule 314 covers the core 312a on the end segment 318 of the fiber 312 and exposes the slanted end surface 330. It is to be noted that in order to obtain an optimal light incident angle, in the present invention, the ferrule 314 and the core 312a therein are slantwise disposed at an inclined angle θ. Namely, an axis of the core 312a in the ferrule 314 has an included angle θ with an axis of other part of the fiber 312. In the present embodiment, the ferrule 314 can be made of ceramic.

In addition, the rigid tube 316 covers the fiber 312 and the ferrule 314, and an axis of the rigid tube 316 is parallel to the axis of other part of the fiber 312. Moreover, the end segment of the ferrule 314 is extruded from the rigid tube 316, such that the light is easily emitted to the slanted end surface 330. In the present embodiment, the rigid tube 316 may be a metal tube, and of course, the rigid tube 316 can be made of ceramic, plastic, or other appropriate rigid material capable of protecting the fiber 312 and the ferrule 314.

A light transmitting/receiving module comprising the fiber assembly mentioned above and a light source is also provided. FIG. 4 schematically shows a light transmitting/receiving module according to a preferred embodiment of the present invention. Referring to FIG. 4, the light source 320 is disposed beside the slanted end surface 330 of the fiber assembly 310 and emits a light 340. The fiber assembly 310 may be a laser diode or other high orientation light source, such as light emitting diode (LED). As shown in FIG. 4, the light 340 is emitted to the slanted end surface 330 in a direction parallel to the axis of the rigid tube 316. Since the ferrule 314 and the core 312a therein are slantwise disposed at an inclined angle θ, it has an included angle θ with the axis of the rigid tube 316. Accordingly, the light 340 is emitted to the slanted end surface 330 in an optimal incident angle, such that an optimal light coupling efficiency is obtained.

It is to be noted that the present invention does not limit the value of the angle θ. It will be apparent to one of ordinary skills in the art that the angle θ varies depending on the optical properties (e.g. the numerical aperture, the refractive index, etc.), the wave length of the incident light, the slope of the slanted end surface, or the relative position of the light source and the fiber assembly.

In summary, the fiber assembly and the light transmitting/receiving module provided by the present invention at least has the following characteristics and advantages:

(1) The ferrule is slantwise disposed with the fiber and the light emitting direction of the light source is parallel to the rigid tube in the present invention, such that the light emitted by the light source is emitted to the slanted end surface in an optimal incident angle, and an optimal light coupling efficiency is obtained.

(2) The present invention merely changes the deposition of the ferrule and does not change the deposition of other devices. Accordingly, both the manufacturing process and the positioning are simplified, which improves the light coupling efficiency and normal distribution.

(3) In the present invention, no additional component (e.g. the outer tube) is required to slantwise dispose the fiber assembly, which simplifies the device design and further reduces the manufacturing cost.

Although the invention has been described with reference to a particular embodiment thereof, it will be apparent to one of the ordinary skills in the art that modifications to the described embodiment may be made without departing from the spirit of the invention. Accordingly, the scope of the invention will be defined by the attached claims not by the above detailed description.

What is claimed is:

1. A fiber assembly, comprising:
   a fiber having an end segment, wherein the end segment has a slanted end surface;
   a ferrule covering the end segment and exposing the slanted end surface; and
   a rigid tube covering the fiber and the ferrule, wherein a middle segment of the fiber that is covered by the rigid tube but not covered by the ferrule has an axis parallel to an axis of the rigid tube, but an angle exists between the axis of the middle segment and that of the end segment.

2. The fiber assembly of claim 1, wherein the rigid tube is made of metal.

3. The fiber assembly of claim 1, wherein the ferrule is made of ceramic.

4. The fiber assembly of claim 1, wherein the fiber is a single mode fiber.

5. A light transmitting/receiving module, comprising:
   a fiber having an end segment, wherein the end segment has a slanted end surface;
   a ferrule covering the end segment and exposing the slanted end surface;
   a rigid tube covering the fiber and the ferrule, wherein a middle segment of the fiber that is covered by the rigid tube but not covered by the ferrule has an axis parallel to an axis of the rigid tube, but an angle exists between the axis of the middle segment and that of the end segment; and
   a light source disposed beside the slanted end surface and emitting a light, wherein the light is emitted to the slanted end surface in a direction parallel to the axis of the rigid tube.

6. The light transmitting/receiving module of claim 5, wherein the rigid rube is made of metal.

7. The light transmitting/receiving module of claim 5, wherein the ferrule is made of ceramic.

8. The light transmitting/receiving module at claim 5, wherein the fiber is a single mode fiber.

9. The light transmitting/receiving module of claim 5, wherein the light source comprises a laser diode.

* * * * *